(12) United States Patent
Benjebbour et al.

(10) Patent No.: US 10,313,984 B2
(45) Date of Patent: Jun. 4, 2019

(54) USER TERMINAL AND RADIO COMMUNICATION METHOD

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/966,196

(22) Filed: Apr. 30, 2018

(65) Prior Publication Data

US 2018/0255519 A1    Sep. 6, 2018

Related U.S. Application Data

(63) Continuation of application No. 14/914,914, filed as application No. PCT/JP2014/070730 on Aug. 6, 2014, now Pat. No. 9,986,515.

(30) Foreign Application Priority Data

Aug. 30, 2013  (JP) ................................. 2013-180275

(51) Int. Cl.
  *H04W 52/24*       (2009.01)
  *H04W 52/14*       (2009.01)
  (Continued)

(52) U.S. Cl.
  CPC ......... *H04W 52/243* (2013.01); *H04L 5/0091* (2013.01); *H04W 52/14* (2013.01);
  (Continued)

(58) Field of Classification Search
  CPC .......... H04J 11/00; H04L 1/00; H04L 5/0037; H04L 5/0091; H04W 52/14; H04W 52/146; H04W 52/24; H04W 52/243; H04W 52/346; H04W 52/54; H04W 72/0413; H04W 72/042; H04W 72/082; H04W 88/08
  (Continued)

(56) References Cited

U.S. PATENT DOCUMENTS 8,339,932 B2    12/2012 Kwon et al.
9,723,605 B2 *   8/2017 Konuskan ............. H04W 72/14
(Continued)

FOREIGN PATENT DOCUMENTS

| EP | 1814236 A1 | 8/2007 |
| EP | 2296409 A1 | 3/2011 |
| JP | 2013-009288 A | 1/2013 |

OTHER PUBLICATIONS

Office Action issued in the counterpart Japanese Patent Application No. 2013-180275, dated May 22, 2018 (5 pages).
(Continued)

*Primary Examiner* — Robert J Lopata
(74) *Attorney, Agent, or Firm* — Osha Liang LLP

(57) ABSTRACT

A user terminal includes a receiver that receives, from a radio base station, indication information to indicate whether or not uplink signals of a plurality of user terminals are non-orthogonal-multiplexed; a processor that switches between transmission power control methods based on the indication information; and a transmitter that transmits an uplink signal by using a switched transmission power control method.

4 Claims, 12 Drawing Sheets

(51) Int. Cl.
*H04W 52/54* (2009.01)
*H04W 52/34* (2009.01)
*H04L 5/00* (2006.01)
*H04W 72/04* (2009.01)
*H04W 72/08* (2009.01)
*H04J 11/00* (2006.01)
*H04L 1/00* (2006.01)
*H04W 88/08* (2009.01)

(52) U.S. Cl.
CPC ......... *H04W 52/24* (2013.01); *H04W 52/242* (2013.01); *H04W 52/346* (2013.01); *H04W 52/54* (2013.01); *H04W 72/042* (2013.01); *H04W 72/0413* (2013.01); *H04W 72/082* (2013.01); *H04J 11/00* (2013.01); *H04L 1/00* (2013.01); *H04L 5/0037* (2013.01); *H04W 52/146* (2013.01); *H04W 88/08* (2013.01)

(58) Field of Classification Search
USPC .......................................... 370/328
See application file for complete search history.

(56) References Cited

U.S. PATENT DOCUMENTS

| | | | | |
|---|---|---|---|---|
| 2009/0098899 A1* | 4/2009 | Gorokhov | ........... | H04W 52/146 455/522 |
| 2009/0141700 A1* | 6/2009 | Baldemair | ........... | H04B 7/2681 370/350 |
| 2009/0312042 A1* | 12/2009 | Rudrapatna | ........... | H04B 1/126 455/501 |
| 2014/0003388 A1* | 1/2014 | Tidestav | ............... | H04W 52/40 370/331 |
| 2014/0029562 A1* | 1/2014 | Kishiyama | .......... | H04W 72/082 370/329 |
| 2014/0086372 A1* | 3/2014 | Kishiyama | ........... | H04J 11/0036 375/346 |
| 2014/0113678 A1* | 4/2014 | Combes | ............... | H04W 52/343 455/522 |
| 2014/0288723 A1* | 9/2014 | Persson | ............... | H04W 52/545 700/297 |
| 2014/0328298 A1* | 11/2014 | Hooli | .................. | H04W 52/242 370/329 |
| 2015/0237637 A1* | 8/2015 | Venkatraman | ...... | H04W 72/082 370/329 |
| 2016/0037460 A1* | 2/2016 | Benjebbour | .......... | H04L 1/0003 370/329 |
| 2016/0205695 A1* | 7/2016 | Kishiyama | .......... | H04W 72/082 370/315 |

OTHER PUBLICATIONS

International Search Report issued in PCT/JP2014/070730 dated Nov. 11, 2014 (2 pages).
Written Opinion of the International Searching Authority issued in PCT/JP2014/070730 dated Nov. 11, 2014 (4 pages).
ETSI TS 136 213 V12.4.0; "LTE; Evolved Universal Terrestrial Radio Access (E-UTRA); Physical layer procedures (3GPP TS 36.213 version 12.4.0 Release 12)"; Feb. 2015; (225 pages).
European Search Report issued in corresponding European Application No. 14840899.0, dated Mar. 16, 2017 (8 pages).
Office Action issued in corresponding European Patent Application No. 14840899.0, dated Aug. 1, 2017 (5 pages).
Office Action issued in corresponding Japanese Patent Application No. 2013-180275, dated Sep. 12, 2017 (9 pages).

* cited by examiner

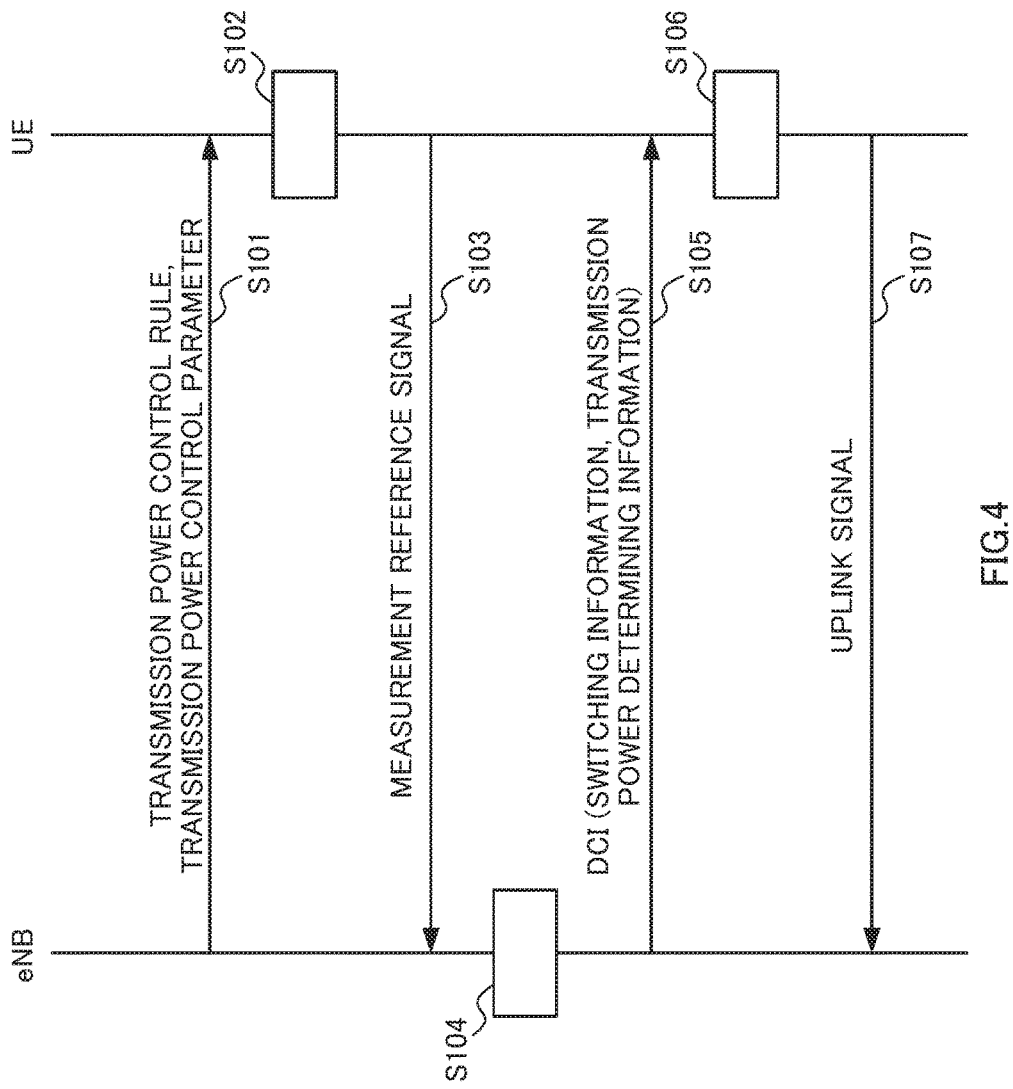

USER TERMINAL AND RADIO COMMUNICATION METHOD

CROSS-REFERENCE TO RELATED APPLICATIONS

The present application is a continuation application of and, thereby, claims benefit under 35 U.S.C. § 120 to U.S. patent application Ser. No. 14/914,914 filed on Feb. 26, 2016, titled, "RADIO BASE STATION, USER TERMINAL AND TRANSMISSION POWER CONTROL METHOD" which is a national stage application of PCT Application No. PCT/JP2014/070730, filed on Aug. 6, 2014, which claims priority to Japanese Patent Application No. 2013-180275 filed on Aug. 30, 2013. The contents of the priority applications are incorporated by reference in their entirety.

TECHNICAL FIELD

The present invention relates to a radio base station, a user terminal and a transmission power control method that are suitable for future radio communication systems.

BACKGROUND ART

In UMTS (Universal Mobile Telecommunications System), which is also referred to as "W-CDMA (Wideband Code Division Multiple Access)," code division multiple access (CDMA) is used as a radio access scheme. CDMA is a radio access scheme that does not provide orthogonality within cells. Consequently, in UMTS, transmission power control (TPC) is executed in order to reduce the multiple access interference (interference between users within cells, interference within cells, etc.) that accompanies the near-far problem.

Also, in the uplink in LTE (Long Term Evolution), single carrier frequency division multiple access (SC-FDMA) is used as a radio access scheme (see, for example, non-patent literature 1). SC-FDMA is a radio access scheme that provides orthogonality within cells. Also, in LTE, link adaptation is carried out, such as scheduling per transmission time interval (TTI) that is one msec long, adaptive modulation and coding (AMC) and so on. Consequently, in LTE, unlike W-CDMA, it is not necessary to execute transmission power control for reducing the interference between users within cells.

Meanwhile, since LTE is based upon one-cell frequency reuse, interference from nearby cells (inter-cell interference) and the propagation loss (path loss) between user terminals and radio base stations increase. Consequently, in LTE, transmission power control to take into account inter-cell interference, propagation loss and so on is executed in order to fulfill the required received quality with respect to uplink signals (see, for example, non-patent literature 1).

CITATION LIST

Non-Patent Literature

Non-Patent Literature 1: 3GPP IS 36.213, V8.8.0 "Evolved Universal Terrestrial Radio Access (E-UTRA); Physical layer procedures"

SUMMARY OF INVENTION

Technical Problem

Now, in future radio communication systems referred to as, for example, "FRA (Future Radio Access)," the use of non-orthogonal multiple access (NOMA), which is premised upon canceling interference on the receiving end, as an uplink radio access scheme, is under study.

In non-orthogonal multiple access, uplink signals from a plurality of user terminals with varying channel states (for example, varying propagation losses, SINRs (Signal to Interference plus Noise Ratios), SNRs (Signal-Noise Ratios), etc.) are superposed (non-orthogonal multiplexed) on the same radio resource, and transmitted with different transmission power. On the receiving end, the uplink signals for desired user terminals are extracted by cancelling other user terminals' uplink signals.

However, when non-orthogonal multiple access (NOMA) is used on the uplink, if the above-noted transmission power control for LTE, which is directed to reducing inter-cell interference, is applied to uplink signals of a plurality of user terminals that are non-orthogonal-multiplexed, this might result in a threat that the gain of non-orthogonal multiplexing cannot be optimized.

The present invention has been made in view of the above, and it is therefore an object of the present invention to provide a radio base station, a user terminal and a transmission power control method, whereby uplink signal transmission power control that is suitable when non-orthogonal multiple access (NOMA) is used on the uplink can be executed.

Solution to Problem

The transmission power control method of the present invention provides an uplink signal transmission power control method, which includes the steps of, in a radio base station, deciding whether or not to non-orthogonal-multiplex uplink signals of a plurality of user terminals, transmitting, to a user terminal, switching information to command a switch to one of a first transmission power control method, which is used when the uplink signals are non-orthogonal-multiplexed, and a second transmission power control method, which is used when the uplink signals are not non-orthogonal-multiplexed, based on the decision in the decision section, and transmission power determining information, which is used to determine transmission power of an uplink signal, and in the user terminal, determining the transmission power of the uplink signal based on the switching information and the transmission power determining information, and transmitting the uplink signal with the determined transmission power.

Advantageous Effects of Invention

According to the present invention, it is possible to execute uplink signal transmission power control that is suitable when non-orthogonal multiple access (NOMA) is used on the uplink.

BRIEF DESCRIPTION OF DRAWINGS

FIG. 4 is a sequence diagram to show the transmission power control method according to the first example;

DESCRIPTION OF EMBODIMENTS

Figure 1:
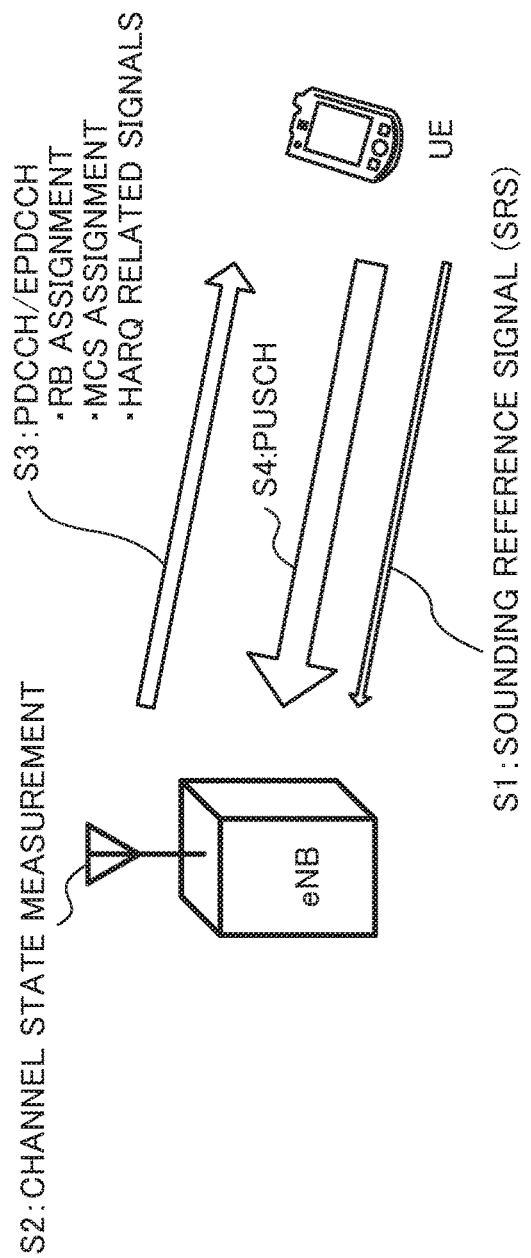
FIG. 1 is a diagram to explain an example of link adaptation on the uplink.

FIG. 1 is a diagram to explain an example of link adaptation on the uplink. As shown in FIG. 1, a radio communication system to employ link adaptation is formed to include a radio base station (eNB: Macro eNodeB) that forms a cell and a user terminal (UE: User Equipment).

In the radio communication system shown in FIG. 1, the user terminal transmits a sounding reference signal (SRS) on the uplink (step S1). Using the sounding reference signal, the radio base station measures the uplink channel state (for example, the SINR (Signal to Interference plus Noise Ratio), the SNR (Signal-Noise Ratio), the RSRQ (Reference Signal Received Quality) and so on, also referred to as "channel gain") (step S2).

Also, based on the measured channel state, the radio base station allocates the user to radio resources (for example, resource blocks (RBs)) (scheduling). Also, based on the measured channel state, the radio base station determines the modulation scheme and coding rate (adaptive modulation and coding (AMC)).

The radio base station transmits radio resource allocation information (RB assignment), modulation and coding scheme information (MCS assignment) to represent the modulation scheme and coding rate, retransmission control information (HARQ-related signals) and so on, by using a downlink control channel (PDCCH: Physical Downlink Control Channel, EPDCCH: Enhanced Physical Downlink Control Channel, etc.) (step S3).

The user terminal transmits an uplink shared channel (PUSCH: Physical Uplink Shared Channel) by using the radio resource represented by the allocation information from the radio base station and by using the modulation scheme and coding rate represented by the modulation and coding scheme information (step S4).

In this way, a radio communication system which executes link adaptation is able to follow instantaneous fading fluctuations by means of adaptive modulation and coding (AMC), so that there is no need to execute high-speed transmission power control (for example, transmission power control per several milliseconds to several tens of milliseconds). Meanwhile, in order to fulfill the required received quality with respect to uplink signals, it is necessary to execute transmission power control taking into account inter-cell interference and propagation loss.

So, in a radio communication system to execute link adaptation, transmission power control for uplink signals (for example, the above-mentioned uplink shared channel, an uplink control channel (PUCCH: Physical Uplink Control Channel), reference signals (for example, the SRS), etc.) is executed by combining open-loop control and closed-loop control. Open-loop control is executed based on parameters reported from radio base stations in a comparatively long cycle and the propagation loss measured by user terminals.

On the other hand, closed-loop control is executed base on TPC (Transmission Power Control) commands reported from radio base stations in a comparatively short cycle. Note that TPC commands are determined based on channel states between user terminals and radio base stations (for example, the SINR, the SNR, the RSRQ, etc.). Also, TPC commands may assume values that are determined based on the difference between the average received SINR that is averaged in a radio base station over an averaging period t and the target received SINR.

Uplink signal transmission power control combining open-loop control and closed-loop control in this way is also referred to as "fractional transmission power control (TPC)." In fractional TPC, for example, the transmission power of an uplink shared channel (PUSCH) in a subframe i is determined by an equation 1:

$$P_{PUSCH}(i) = \min\{P_{CMAX}, \underbrace{10\log_{10}(M_{PUSCH}(i)) + P_{O\_PUSH}(j) + \alpha \cdot PL + \Delta_{TF}(i)}_{\text{Outer loop control}} + \underbrace{f(i)\}}_{\text{Closed loop control}}$$ (Equation 1)

where $P_{CMAX}$ is the maximum transmission power of the user terminal. Also, $M_{PUSCH}$ is the transmission bandwidth. Also, $P_{O\_PUSCH}$ is the target received power when the propagation loss is 0. Also, $\alpha$ is a fractional TPC weighting coefficient. PL is the measurement value of propagation loss in the user terminal. Also, $\Delta_{TF}$ is an offset to correspond to MCS (modulation scheme and coding rate), and may be 0. f(i) is a correction value by a TPC command.

According to fractional TPC, in open-loop control, the PL term is changed and the target received power is configured depending on the user terminal's propagation loss. To be more specific, the target received power for user terminals in cell-edge parts is configured low, and the target received power for user terminals in mid-cell parts is configured high. Consequently, according to the open-loop control of the above equation 1, inter-cell interference can be reduced. Note that the parameters in the above equation 1 may be changed as appropriate.

Figure 2A:
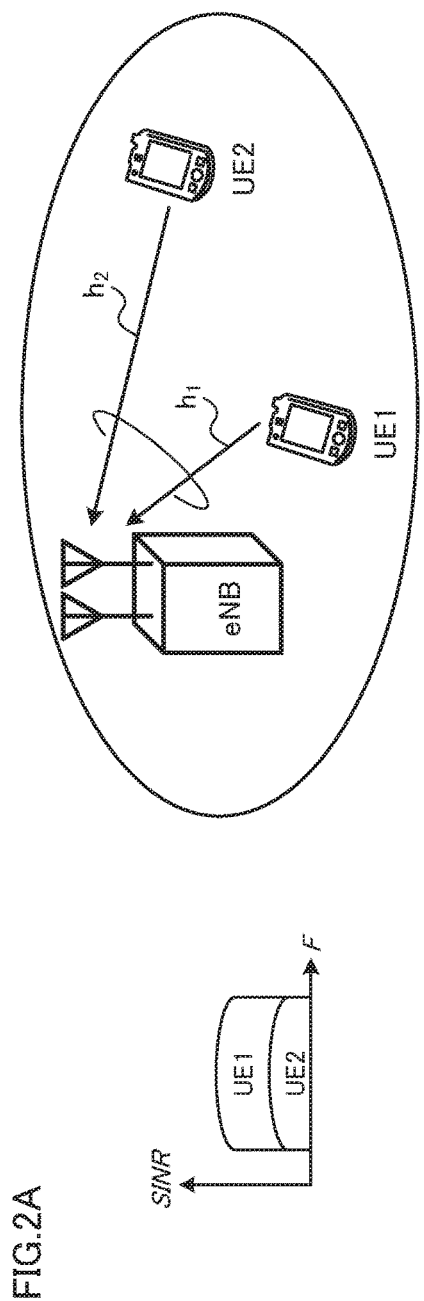
FIGS. 2A and 2B each show a diagram to explain an example of non-orthogonal multiple access (NOMA) on the uplink.

Now, the use of non-orthogonal multiple access (NOMA) as an uplink radio access scheme is under study. FIG. 2 is a diagram to explain an example of NOMA on the uplink. FIG. 2A illustrates a case where a user terminal (UE) 1 is located in a middle part of a cell (hereinafter referred to as a "mid-cell part") that is formed by a radio base station (eNB), and where a user terminal (UE) 2 is located in an edge part of the cell (hereinafter referred to as an "cell-edge part"). In FIG. 2A, the propagation loss in the cell increases from the mid-cell part towards the cell-edge part. Consequently, in the radio base station, the received SINR from the user terminal 2 is lower than the received SINR from the user terminal 1.

In uplink NOMA, a plurality of user terminals with varying channel states (for example, varying propagation losses, SINRs, SNRs and so on, also referred to as "channel gain") are multiplexed over the same radio resource. For example, in FIG. 2A, the user terminals 1 and 2, which show different received SINRs in the radio base station, are multiplexed over the same radio resource. The radio base station extracts the desired uplink signals by canceling interference signals from received signals by means of SIC (Successive Interference Cancellation). To be more specific, the radio base station decodes the uplink signals from the user terminals in descending order of the received SINR, and cancels the decoded uplink signals.

For example, if, in FIG. 2A, the uplink signals of the user terminals 1 and 2 are non-orthogonal-multiplexed, the received signal y at the radio base station can be represented by an equation 2:

$$y = h_1\sqrt{P_1}x_1 + h_2\sqrt{P_2}x_2 + w \quad \text{(Equation 2)}$$

where $x_1$ and $x_2$ represent the uplink signals from the user terminals 1 and 2, respectively. Also, $P_1$ and $P_2$ represent the transmission powers of the uplink signals from the user terminals 1 and 2. Also, $h_1$ and $h_2$ represent the channel states between the user terminals 1 and 2 and the radio base station, respectively. Also, w is a predetermined coefficient.

Figure 2B:
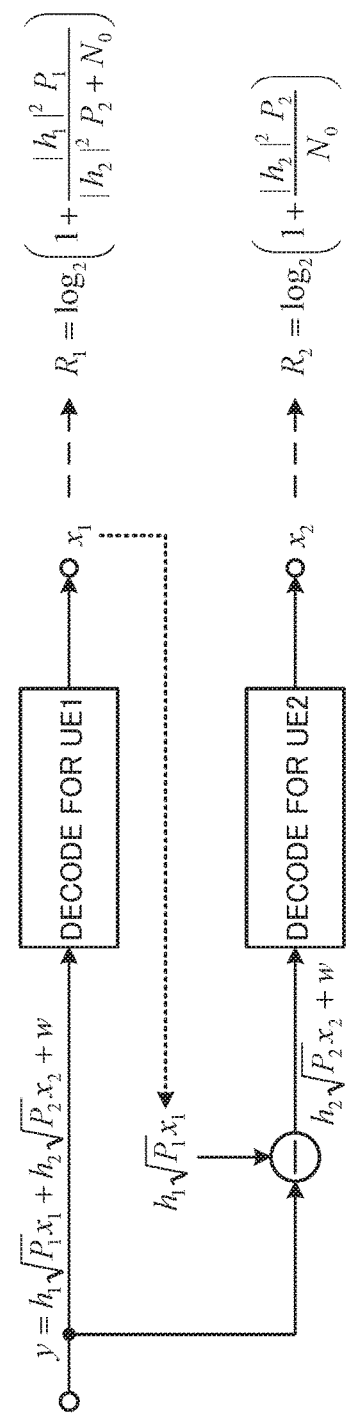

As shown in FIG. 2B, the radio base station decodes the uplink signal from the user terminal 1 having the higher received SINR, generates a replica of this uplink signal and subtracts this from the received signal y. Next, the radio base station decodes the user terminal 2 with the lower received SINR, based on the result of subtracting the uplink signal from the user terminal 1. Note that, in FIG. 2B, $R_1$ and $R_2$ represent the uplink transmission rates (rates) from the user terminals 1 and 2.

In this way, when NOMA is used as an uplink radio access scheme, it is desirable to adequately control the transmission powers $P_1$ and $P_2$ of the user terminals 1 and 2 that are non-orthogonal-multiplexed, and maximize the performance indicators of the throughput in cell-edge parts, the throughput of the whole cell and so on.

However, when NOMA is used as an uplink radio access scheme, if, for example, transmission power control to use the above equation 1 is applied to uplink signals of a plurality of user terminals that are non-orthogonal-multiplexed, there is a threat that the improvement of system performance by non-orthogonal multiplexing cannot be optimized.

To be more specific, in FIG. 2A, according to the transmission power control of above equation 1, the transmission power of the user terminal 2 in a cell-edge part is made bigger, and the transmission power of the user terminal 1 in a mid-cell part is made smaller. However, the transmission power control of the above equation 1 is designed mainly to reduce the interference against other cells. Since multiple users are multiplexed in the same cell in NOMA, it is desirable to control uplink transmission power so that the difference between the received SINRs of the uplink signals from the user terminals 1 and 2 in the radio base station increases, based on the channel gains of the multiple users, rather than reduce the interference against other cells. Consequently, if the transmission power control of the above equation 1 is executed, there is a threat that the improvement of system performance by non-orthogonal multiplexing cannot be optimized.

So, the present inventors have conceived of preventing the situation where the gain of non-orthogonal multiplexing cannot be optimized when uplink signals of a plurality of user terminals are non-orthogonal-multiplexed over the same radio resource, by making the transmission power control method for when uplink signals of a plurality of user terminals are non-orthogonal-multiplexed and the transmission power control method for when uplink signals of a plurality of user terminals are not non-orthogonal-multiplexed different.

With the transmission power control method according to a first example of the present invention, a radio base station decides whether or not to non-orthogonal-multiplex uplink signals of a plurality of user terminals, generates switching information to command a switch to one of a first transmission power control method, which is used when the uplink signals are non-orthogonal-multiplexed, and a second transmission power control method, which is used when the uplink signals are not non-orthogonal-multiplexed, based on the decision, and transmission power determining information, which is used to determine transmission power of the uplink signal, and transmits the switching information and the transmission power determining information to the user terminal. The user terminal determine the transmission power of an uplink signal based on the switching information and the transmission power determining information, and transmit the uplink signal with the determined transmission power.

With the transmission power control method according to the first example the present invention, a user terminal switches between the first transmission power control method and the second transmission power control method for application, based on the switching information from the radio base station, so that it is possible to prevent the situation where the gain of non-orthogonal multiplexing cannot be optimized when uplink signals of a plurality of user terminals are non-orthogonal-multiplexed.

Also, the present inventors have conceived of preventing the situation where the gain of non-orthogonal multiplexing cannot be optimized when uplink signals from a plurality of user terminals are non-orthogonal-multiplexed, by allowing a radio base station to determine the transmission power of the uplink signals and report the determined transmission power to user terminals, rather than allowing the user terminals themselves to calculate the transmission power of the uplink signals.

With the transmission power control method according to a second example of the present invention, a radio base station determines transmission power of an uplink signal and transmits transmission power allocation information to represent the determined transmission power to a user terminal. The user terminal transmits the uplink signal with the transmission power represented by the transmission power allocation information.

With the transmission power control method according to the second example of the present invention, when uplink signals from user terminals are non-orthogonal-multiplexed, a radio base station determines the transmission power of the uplink signals so that the gain of non-orthogonal multiplexing can be optimized, and reports the determined transmission power to the user terminals, so that it is possible to prevent the situation where the gain of non-orthogonal multiplexing cannot be optimized.

Now, the transmission power control methods according to the first and second examples of the present invention will be described.

First Example

The transmission power control method according to the first example will be described with reference to FIGS. 3 to 5. With the transmission power control method according to the first example, a radio base station decides whether or not to non-orthogonal-multiplex uplink signals of a plurality of user terminals. Also, based on the decision, the radio base station transmits, to the user terminals, switching information to command a switch to a first transmission power control method (hereinafter referred to as "NOMA power control method") for when the uplink signals are non-orthogonal-multiplexed, or to a second transmission power control method (hereinafter referred to as "OMA power control method") for when the uplink signals are not non-orthogonal-multiplexed, and transmission power determining information to determine the uplink signals.

Here, when the switching information commands a switch to the NOMA power control method, the transmission power determining information may be a predetermined threshold for the channel states (for example, the SINRs, the SNRs, the RSRPs, etc.) between the user terminals and the radio base station. On the other hand, when the switching information commands a switch to the OMA power control method, the transmission power determining information may be a TPC command.

Also, the switching information may be transmitted using a downlink control channel, or may be transmitted using higher layer signaling such as RRC signaling. Also, the transmission power determining information is transmitted using a downlink control channel. Below, a case will be described as an example where the switching information and the transmission power determining information are transmitted using a downlink control channel.

Figure 3B:
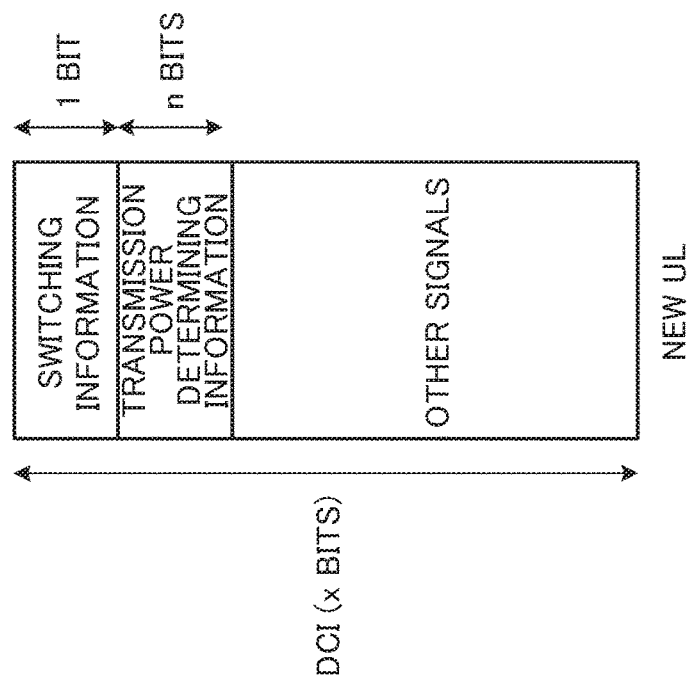
FIGS. 3A and 3B each provide a diagram to explain downlink control information that is used in a transmission power control method according to a first example.
Figure 3A:
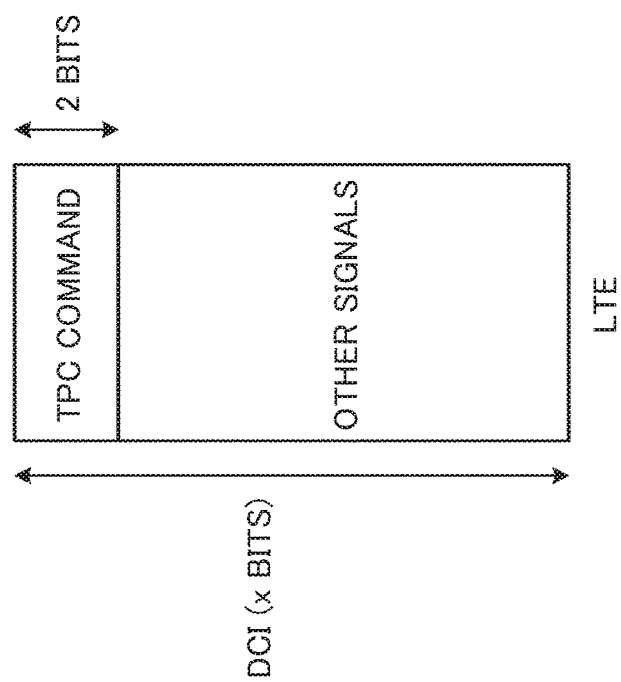

FIG. 3A shows an example of downlink control information (DCI) that is transmitted using a downlink control channel. As shown in FIG. 3A, in the transmission power control method using the above equation 1, DCI (for example, DCI formats 0, 3 and 4) includes a TPC command. For example, in FIG. 3A, an increase or a decrease of uplink signal transmission power is commanded by a two-bit TPC command, in four steps.

FIG. 3B shows an example of DCI that is used in the transmission power control method according to the first example. As shown in FIG. 3B, with the transmission power control method according to the first example, DCI includes the above-noted switching information and transmission power determining information. As shown in FIG. 3B, the switching information is formed with one bit, and command a switch to the NOMA power control method or to the OMA power control method with "0" or "1." For example, "0" commands a switch to the OMA power control method, and "1" commands a switch to the NOMA power control method.

Note that which of "0" and "1" commands a switch to the NOMA power control method or the OMA power control method is by no means limited to the above as long as it is provided for in the switching rules (which will be described later). Also, the number of bits of the switching information is not limited to one bit either.

Also, in FIG. 3B, when the switching information commands a switch to the OMA power control method, the transmission power determining information may be a TPC command (see FIG. 3A). On the other hand, when the switching information indicates the NOMA power control method, the transmission power determining information may be a predetermined threshold for the channel states between the user terminals and the radio base station (for example, the SINRs, the SNRs, the RSRPs, etc.).

FIG. 4 is a sequence diagram to show the transmission power control method according to the first example. In FIG. 4, the switching information is transmitted by using a downlink control channel (PDCCH, EPDCCH, etc.), but may also be transmitted using higher layer signaling such as RRC signaling.

As shown in FIG. 4, a radio base station reports transmission power control rules, which are the rules for executing transmission power control, and transmission power control parameters, which are the parameters to use in transmission power control, to user terminals (step S101). For example, the transmission power control rules and the transmission power control parameters are reported to the user terminals through higher layer signaling such as RRC signaling.

To be more specific, the transmission power control rules include the rules for switching between the NOMA power control method and the OMA power control method, and the rules regarding the channel state and a predetermined threshold in the NOMA power control method. For example, the switching rules may provide for commanding a switch to the OMA power control method when the switching information is "0" and commanding a switch to the NOMA power control method when the switching information is "1." Also, the decision rules may provide for applying a transmission power P1 when the channel state is better than a predetermined threshold and applying a transmission power P2 when the channel state is poorer than the predetermined threshold, in the NOMA power control method. Note that the transmission power control rules are not limited the rules described above.

Also, the transmission power control parameters include, as parameters to use in the OMA power control method, the maximum transmission power $P_{CMAX}$, the target received power $P_{O\_PUSCH}$ and the weighting coefficient α in the above equation 1, and so on. Also, the transmission power control parameters include the above-noted transmission powers P1 and P2 as parameters to use in the OMA power control method.

The user terminals memorize the transmission power control rules and the transmission power control parameters that are reported in a memory section (step S102). The user terminals transmit uplink channel state measurement reference signals (for example, SRSs) (step S103).

The radio base station measures the channel states (for example, the SINRs, the SNRs, the RSRPs, etc.) based on the measurement reference signals from the user terminals, and, based on the measurement results, determines whether or not to non-orthogonal-multiplex uplink signals of a plurality of user terminals (step S104).

When uplink signals of a plurality of user terminals are non-orthogonal-multiplexed, the radio base station generates switching information to command a switch to the NOMA power control method, and transmission power determining information to represent a predetermined threshold Th with respect to the channel states. Also, the radio base station determines the combination of a plurality of user terminals to be non-orthogonal-multiplexed (user set, UE set, etc.). On the other hand, when not non-orthogonal-multiplexing uplink signals of a plurality of user terminals, the radio base station generates switching information to command a switch to the OMA power control method, and generates a TPC command as transmission power determining information.

The radio base station transmits DCI, which includes the switching information and transmission power determining information that are generated, to the user terminals, by using a downlink control channel (step S105). The user terminals switch between the NOMA power control method and the OMA power control method based on the switching information, and configure the transmission power of uplink signals based on the transmission power determining information (step S106).

Figure 5:
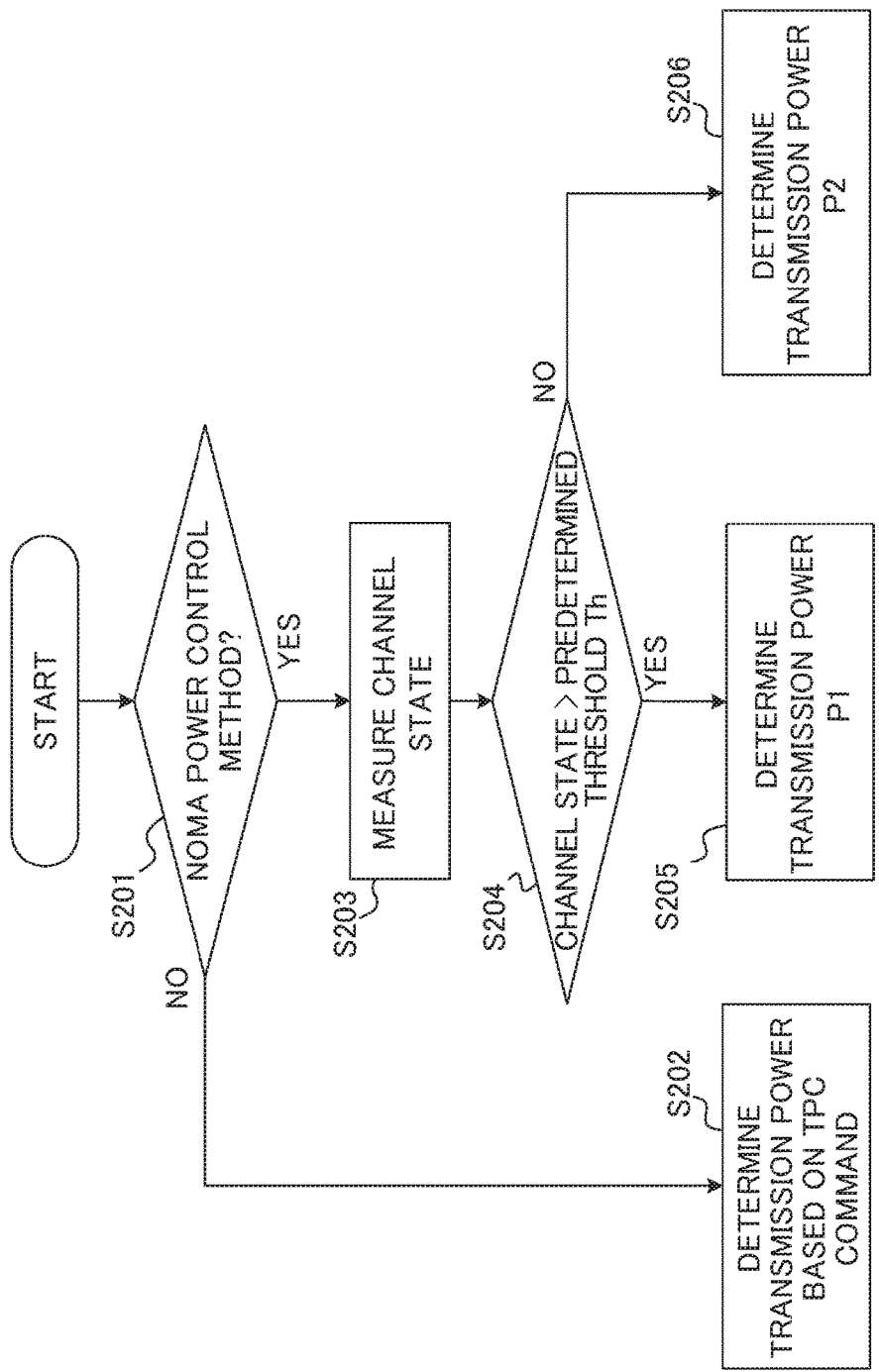
FIG. 5 is a flowchart to show the transmission power control method according to the first example.

FIG. 5 is a flowchart to show the operation of the user terminals in step S106 in detail. As shown in FIG. 5, the user terminals determine whether or not to switch to (whether or not to apply) the NOMA power control method (step S201) based on the switching information (see step S105 of FIG. 4) and the switching rules (see step S101 of FIG. 4). For example, in accordance with the switching rules, the user terminals may determine switching to the NOMA power control method when the switching information is "1" and determine switching to the OMA power control method when the switching information is "0."

When switching to the OMA power control method (step S201: NO), the user terminals configure the transmission power of uplink signals based on the TPC command provided as transmission power determining information (see step S105 in FIG. 4) (step S202). For example, the user terminals may substitute f(i) in the above equation 1 with the correction value by the TPC command and configure the uplink signal transmission power.

On the other hand, when switching to the NOMA power control method (step S201: YES), the channel states (for example, the SINRs, the SNRs, the RSRQs, etc.) between the user terminals and the radio base station are measured by using downlink measurement reference signals (for example, CRSs: Cell-specific Reference Signals, CSI-RSs: Channel State Information-Reference Signals, etc.) (step S203).

The user terminals configure the transmission power of uplink signals based on the comparison results of the measured channel states and the predetermined threshold Th represented by the transmission power determining information. To be more specific, a user terminal decides whether or not the measured channel state is higher than the predetermined threshold Th (step S204). Note that this decision in step S204 is only an example, and different decisions may be made according to the decision rules (step S101 of FIG. 4).

When the channel state is better than the predetermined threshold Th (step S204: YES), the user terminal configures the transmission power P1 (step S205). In this case, the user terminal is estimated to be located in a mid-cell part, so that the transmission power P1, which is lower than the transmission power P2 to be described later, is used.

On the other hand, when the channel state is equal to or lower than the predetermined threshold Th (step S204: NO), the user terminal configures the transmission power P2, which is greater than the transmission power P1 (step S206). In this case, the user terminal is estimated to be located in a cell-edge part, so that the transmission power P2, which is greater than the transmission power P1, is used.

As has been described earlier with respect to steps S203 and S204, when switching to the NOMA power control method (step S201: YES), the user terminal configures the transmission power of uplink signals based on the comparison result of the channel state between the radio base station and the user terminal and a predetermined threshold. Note that the transmission powers P1 and P2 are reported in step S101 of FIG. 4 by using higher layer signaling such as RRC signaling, as transmission power control parameters, but this is by no means limiting. The transmission powers P1 and P2 may be reported from the radio base station to the user terminal by using a downlink control channel. Also, the uplink signal transmission powers P1 and P2 may be configures so that the received SINRs in the radio base station vary sufficiently.

As described above, in step S106 of FIG. 4, the user terminal determines the transmission power of uplink signals. The user terminal transmits the uplink signal with the determined transmission power (step S107). Note that the uplink signals may include an uplink shared channel (PUSCH), an uplink control channel (PUCCH), a reference signal (for example, SRS) and so on.

With the transmission power control method according to the first example, user terminals switch between the NOMA power control method and the OMA power control method for application based on switching information from a radio base station, so that it is possible to prevent the situation where the improvement of system performance by non-orthogonal multiplexing cannot be optimized when uplink signals from a plurality of user terminals are non-orthogonal-multiplexed.

(Variation 1)

With the transmission power control method according to the first example, when uplink signals of a plurality of user terminals are not non-orthogonal-multiplexed, transmission power control to use transmission power correction information (for example, the correction value f(i) in the above equation 1) is executed. With the transmission power control method according to variation 1, the transmission power control to use transmission power correction information is executed not only when uplink signals of a plurality of user terminals are not non-orthogonal-multiplexed, but also when uplink signals of a plurality of user terminals are non-orthogonal-multiplexed.

Here, the transmission power correction information is information for correcting uplink signal transmission power, and for example, is the correction value f(i) by a TPC command in the above equation 1. This transmission power correction information varies depending on whether or not uplink signals of a plurality of user terminals are non-orthogonal-multiplexed.

To be more specific, when uplink signals of a plurality of user terminals are non-orthogonal-multiplexed, the radio base station reports an enhanced TPC command to each of a plurality of user terminals that are non-orthogonal-multiplexed, as transmission power determining information. Based on the enhanced TPC commands, the user terminals may configure different correction values f(i) from the correction values f(i) for when uplink signals of a plurality of user terminals are not non-orthogonal-multiplexed.

(Variation 2)

With the transmission power control method according to the first example, when uplink signals of a plurality of user terminals are non-orthogonal-multiplexed, transmission power control is executed based on comparison results between channel states and a predetermined threshold. With the transmission power control method according to variation 2, transmission power control is executed based on comparison results of channel states and a predetermined threshold, not only when uplink signals of a plurality of user terminals are not non-orthogonal-multiplexed, but also when uplink signals of a plurality of user terminals are non-orthogonal-multiplexed.

Note that, with the transmission power control method according to variation 2, the configuration values of the above-noted transmission powers P1 and P2, which are reported as transmission power control parameters, may vary depending on whether or not uplink signals of a plurality of user terminals are non-orthogonal-multiplexed. Also, the predetermined threshold for channel states may also vary depending on whether or not uplink signals of a plurality of user terminals are non-orthogonal-multiplexed.

It is also possible not to report the above-described switching information. However, the radio base station sends a report as to whether or not uplink signals of a plurality of user terminals are non-orthogonal-multiplexed.

Second Example

Figure 6:
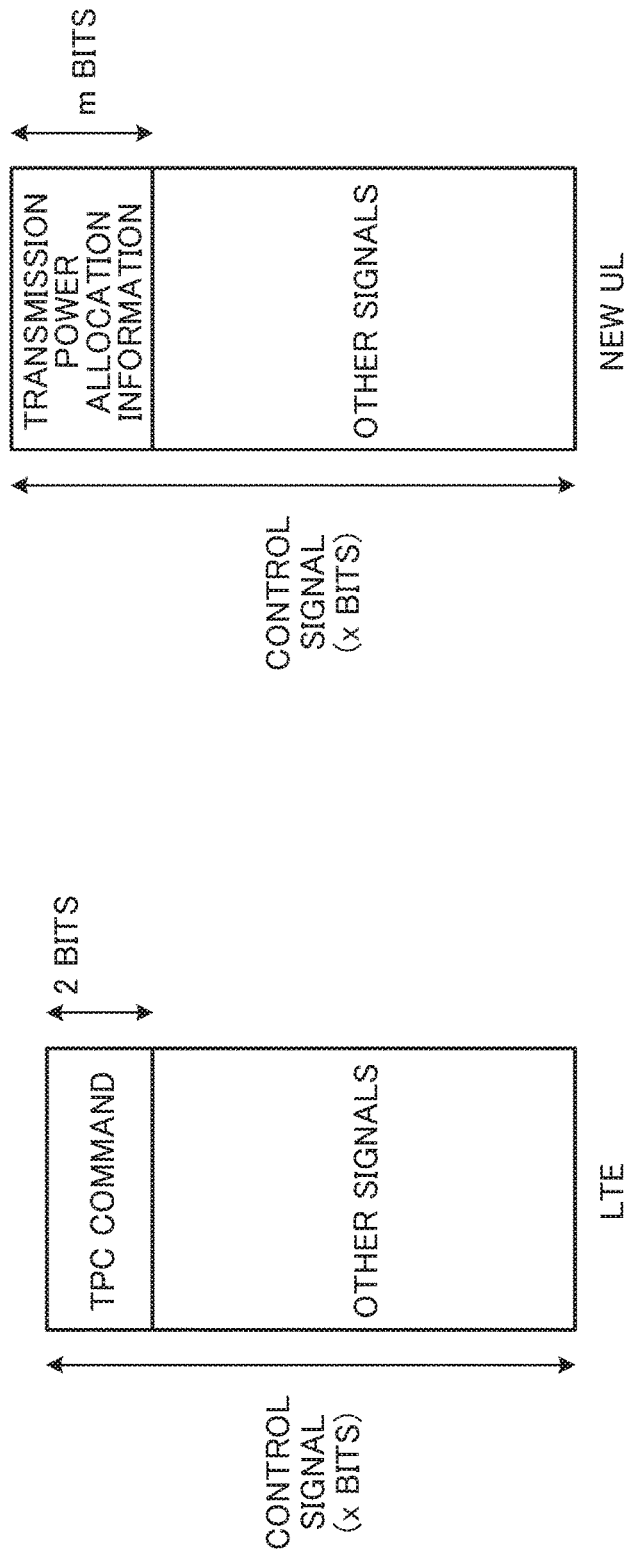
FIGS. 6A and 6B each provide a diagram to explain downlink control information that is used in a transmission power control method according to a second example.

The transmission power control method according to the second example will be described with reference to FIGS. 6 and 7. With the transmission power control method according to the second example, a radio base station decides whether or not to non-orthogonal-multiplex uplink signals of a plurality of user terminals, and determines the transmission power of the uplink signals based on the decision. Also, the radio base station transmits transmission power allocation information to represent the determined transmission power to the user terminals. The user terminals transmit the uplink signals with the transmission power represented by the transmission power allocation information.

In this way, with the transmission power control method according to the second example, in both cases where uplink signals are non-orthogonal-multiplexed and not non-orthogonal-multiplexed, the radio base station determines the transmission power of the uplink signals and reports this to user terminals. In particular, the radio base station determines the transmission power of uplink signals, based on the decisions as to whether or not to non-orthogonal-multiplex the uplink signals, so that the improvement of system performance by non-orthogonal multiplexing can be optimized. Consequently, when uplink signals from a plurality of user terminal are non-orthogonal-multiplexed, it is possible to prevent the situation where the improvement of system performance by non-orthogonal multiplexing cannot be optimized.

Similar to FIG. 3A, FIG. 6A shows an example of DCI that is used in transmission power control methods for LTE and so on. FIG. 6A is the same as FIG. 3A and therefore will not be described. FIG. 6B shows an example of DCI that is used in the transmission power control method according to the second example.

As shown in FIG. 6B, with the transmission power control method according to the second example, DCI includes the above-described transmission power allocation information. For example, in FIG. 6B, the transmission power control information is formed with m bits (m≥1).

Figure 7:
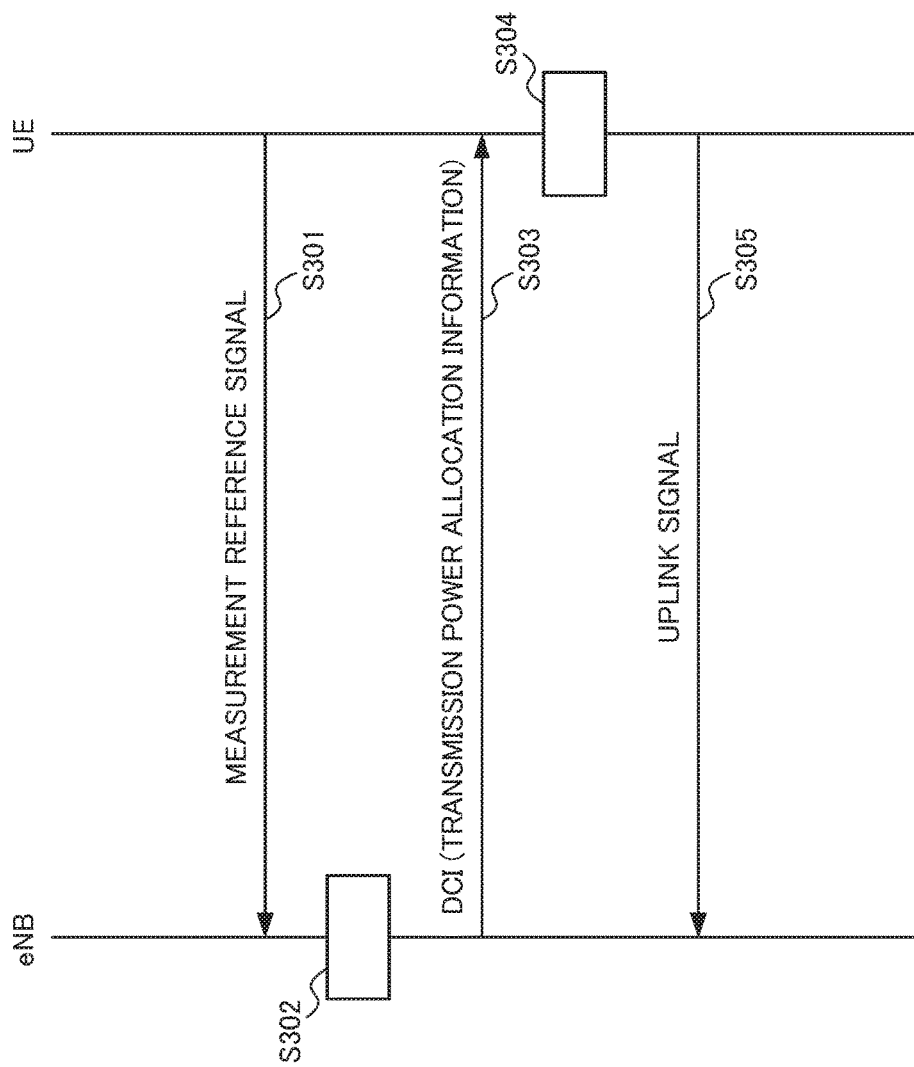
FIG. 7 is a sequence diagram to show the transmission power control method according to the second example.

FIG. 7 is a sequence diagram to show the transmission power control method according to the second example. As shown in FIG. 7, user terminals transmit uplink channel state measurement reference signals (for example, SRSs) (step S301).

The radio base station measures the channel states (for example, the SINRs, the SNRs, the RSRPs, etc.) based on the measurement reference signals from the user terminals, and, based on the measurement results, determine whether or not to non-orthogonal-multiplex uplink signals of a plurality of user terminals, and determines the transmission power of the uplink signals (step S302).

When non-orthogonal-multiplexing uplink signals from a plurality of user terminals, the radio base station determines the combination of these plurality of user terminals (user set, UE set, etc.), and determines the transmission power of the uplink signals of a plurality of user terminals so that the improvement of system performance by non-orthogonal multiplexing is maximized.

On the other hand, when the uplink signals from a plurality of user terminals are not non-orthogonal-multiplexed, the radio base station determines the transmission power of the uplink signals of these user terminals based on the channel states (for example, the SINRs, the SNRs, the RSRPs, etc.) between the user terminals and the radio base station.

The radio base station transmits transmission power allocation information to represent the determined transmission power to the user terminals by using a downlink control channel (step S303). The user terminals configure the transmission power represented by the transmission power allocation information as the transmission power of the uplink signals (step S304). The user terminals transmit the uplink signal with the configured transmission power (step S305).

With the transmission power control method according to the second example, when uplink signals from user terminals are non-orthogonal-multiplexed, the radio base station determines the transmission power of the uplink signals so that the improvement of system performance by non-orthogonal multiplexing can be optimized, and reports the determined transmission power to the user terminals, and therefore it is possible to prevent the situation where the improvement of system performance by non-orthogonal multiplexing cannot be optimized. Also, the radio base station may determine the transmission power of the uplink signals itself and report this to the user terminals, so that, although the overhead increases, the transmission power of uplink signals transmission can be controlled even more adaptively.

(Structure of Radio Communication System)

Now, the structure of the radio communication system according to the present embodiment will be described below. In this radio communication system, the above-described transmission power control methods according to the first and second examples are employed.

Figure 8:
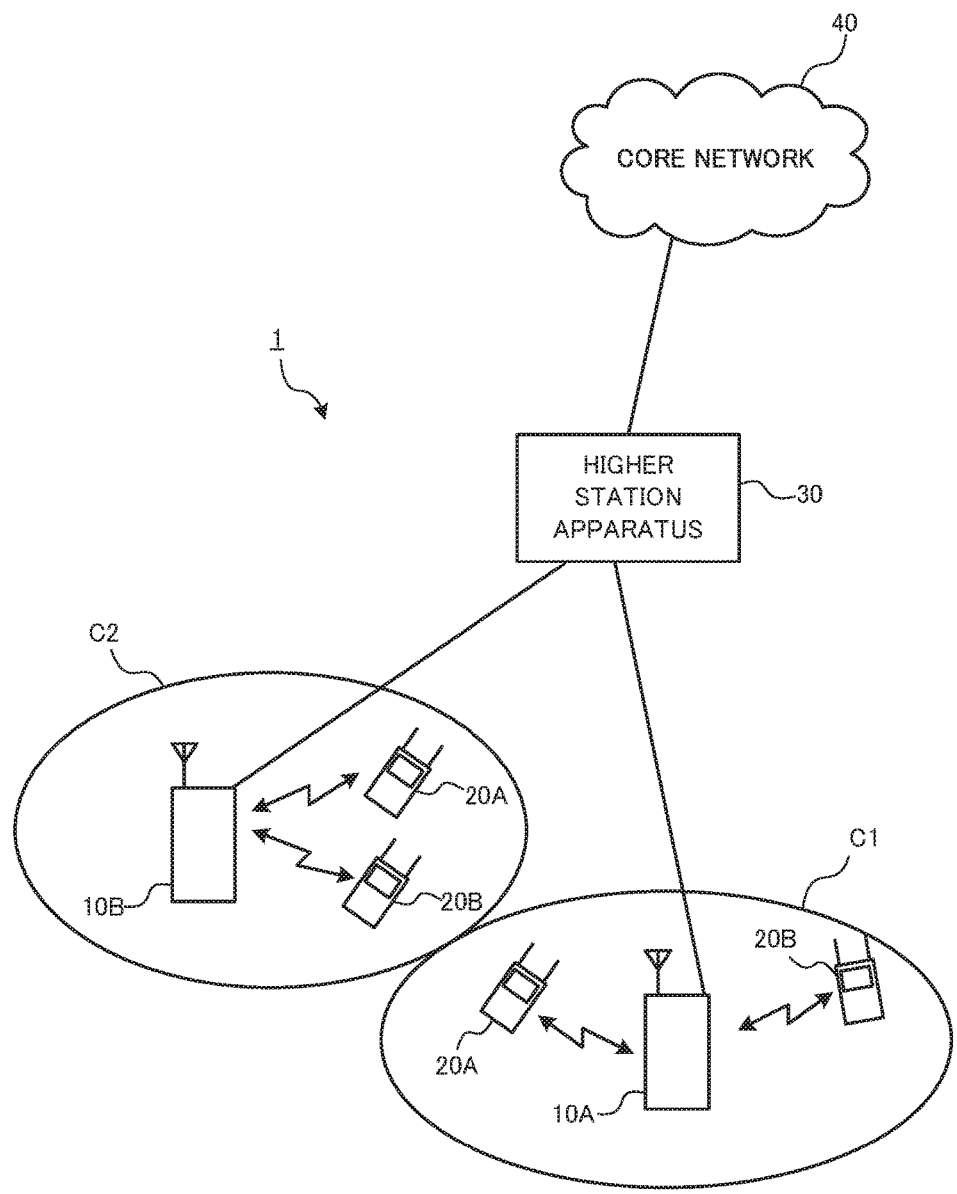
FIG. 8 is a structure diagram of a radio communication system according to the present embodiment.

FIG. 8 is a schematic diagram of the radio communication system according to the present embodiment. As shown in FIG. 8, the radio communication system 1 includes radio base stations 10 (10A and 10B) and a plurality of user terminals 20 (20A and 20B). The radio base stations 10 are connected with a higher station apparatus 30, and this higher station apparatus 30 is connected with a core network 40. Each user terminal 20 can communicate with the radio base stations 10 in cells C1 and C2.

In the radio communication system 1, the radio base stations 10 may be either eNodeBs (eNBs) and transmission points and so on that form (macro) cells, or RRHs (Remote Radio Heads), eNodeBs (eNBs), femto base stations, pico base stations and transmission points and so on that form (small) cells. The user terminals 20 may be mobile terminals or may be stationary terminals. Note that the higher station apparatus 30 may be, for example, an access gateway apparatus, a radio network controller (RNC), a mobility management entity (MME) and so on, but is by no means limited to these.

In the radio communication system 1, non-orthogonal multiple access (NOMA) can be used as an uplink radio access scheme. In NOMA, uplink signals from a plurality of user terminals 20 with varying channel states (varying SINRs, SNRs, propagation losses, etc.) are multiplexed over the same radio resource. Note that it is equally possible to use orthogonal multiple access such as SC-FDMA as an uplink radio access scheme.

Also, in the radio communication system 1, non-orthogonal multiple access (NOMA) may be used as a downlink radio access scheme, or orthogonal multiple access such as OFDMA (Orthogonal Frequency Division Multiple Access) may be used.

Also, in the radio communication system 1, a downlink shared channel (PDSCH), which is used by each user terminal 20 on a shared basis, a downlink control channel (PDCCH), an enhanced downlink control channel (EPDCCH), a PCFICH, a PHICH, a broadcast channel (PBCH) and so on are used as downlink communication channels. Downlink data (including user data, higher layer control information and so on) are transmitted by the PDSCH. Downlink control information (DCI) is transmitted by the PDCCH and the EPDCCH.

Also, in the radio communication system 1, an uplink shared channel (PUSCH), which is used by each user terminal 20 on a shared basis, a physical uplink control channel (PUCCH, EPDCCH, etc.), a random access channel (PRACH) and so on are used as uplink communication channels. Uplink data (including user data, higher layer control information, etc.) is transmitted by the PUSCH. Also, downlink channel state information (described later), delivery acknowledgement information (ACK/NACK) and so on are transmitted by the PUCCH or the PUSCH.

Also, in the radio communication system 1, cell-specific reference signals (CRSs), channel state measurement reference signals (CSI-RSs) and so on are used as downlink reference signals. Also, sounding reference signals (SRSs) and so on are used as uplink reference signals.

The structure of a radio base station according to the present embodiment will be described with reference to FIGS. 9 and 10.

Figure 9:
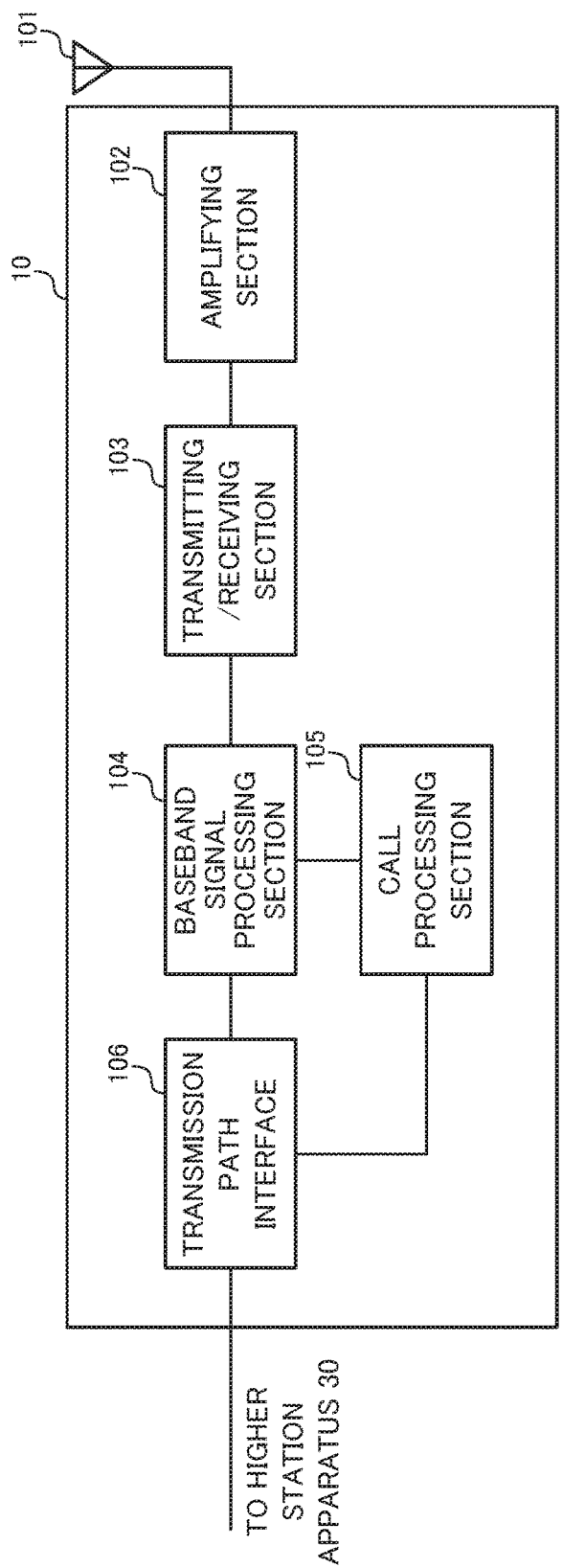
FIG. 9 is a diagram to show an overall structure of a radio base station according to the present embodiment.
Figure 10:
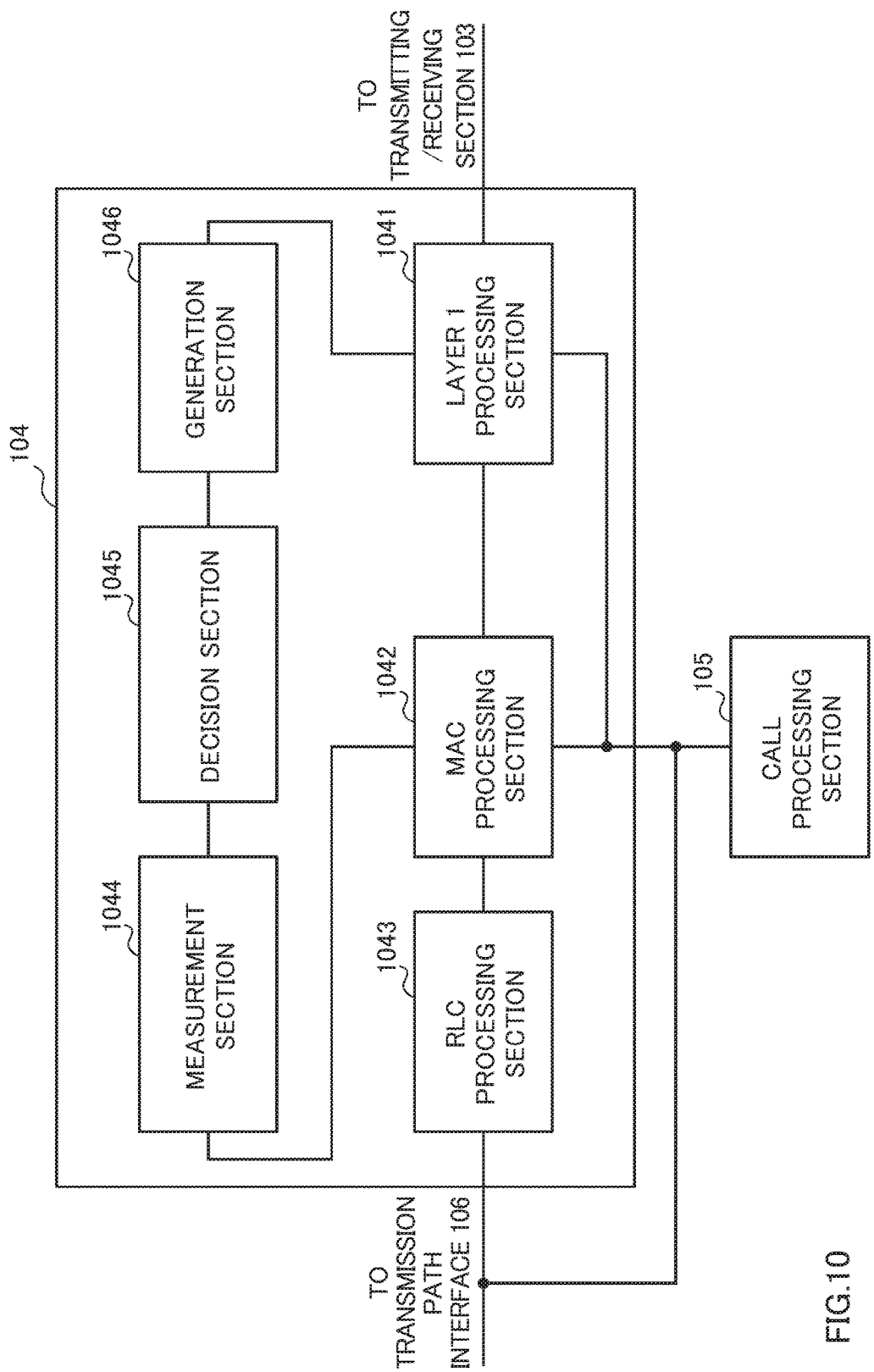
FIG. 10 is diagram to show a functional structure of a radio base station according to the present embodiment.

FIG. 9 is a diagram to explain an overall structure of a radio base station according to the present embodiment. As shown in FIG. 9, a radio base station 10 has a transmitting/receiving antenna (antenna port) 101, an amplifying section 102, a transmitting/receiving section 103 (transmission section and receiving section), a baseband signal processing section 104, a call processing section 105 and a transmission path interface 106. A plurality of transmitting/receiving antenna 101 may be provided.

As for uplink data, a radio frequency signal that is received in the transmitting/receiving antenna 101 is amplified in the amplifying section 102. The amplified radio frequency signal is subjected to frequency conversion in the transmitting/receiving section 103 and converted into a baseband signal. This baseband signal is subjected to predetermined processes (error correction, decoding, etc.) in the baseband signal processing section 104, and then transferred to the higher station apparatus 30 via the transmission path interface 106.

Downlink data is input from the higher station apparatus 30 to the baseband signal processing section 104 via the transmission path interface 106. In the baseband signal processing section 104, a retransmission control (HARQ (Hybrid Automatic Repeat Request)) process, scheduling, transport format selection, channel coding and so on are performed, and the result is transferred to the transmitting/receiving section 103. The baseband signal that is output from the baseband signal processing section 104 is subjected to frequency conversion in the transmitting/receiving section 103 and converted into a radio frequency band. The frequency-converted signal is then amplified in the amplifying section 102 and transmitted from the transmitting/receiving antenna 101.

The call processing section 105 transmits and receives call processing control signals, and manages the state of the radio base station 10, allocates resources, and so on. Note that the processes in the layer 1 processing section 1041 and the MAC processing section 1042 may be controlled by the call processing section 105.

The functional structure of the baseband processing section of the radio base station according to the present embodiment will be described with reference to FIG. 10. FIG. 10 is a functional block diagram of the baseband signal processing section 104 of the radio base station 10. As shown in FIG. 10, the baseband signal processing section 104 has a layer 1 processing section 1041, a MAC (Medium Access Control) processing section 1042, an RLC processing section 1043, a measurement section 1044, a decision section 1045 and a generation section 1046.

The layer 1 processing section 1041 mainly performs processes related to the physical layer. In the layer 1 processing section 1041, processes such as, for example, channel decoding, a discrete Fourier transform (DFT), demapping, a fast Fourier transform (FFT), data demodulation are applied to an uplink signal that is received in the transmitting/receiving section 103. Also, processes such as channel coding, data modulation, mapping, an inverse fast Fourier transform (IFFT) and so on are applied to an uplink signal that is transmitted in the transmitting/receiving section 103.

The MAC processing section 1042 applies processes such as MAC layer retransmission control (HARQ) for the uplink signal, uplink/downlink scheduling, transport format selection for the PUSCH/PDSCH, resource block selection for the PUSCH/PDSCH and so on.

For packets received on the uplink/packets to transmit on the downlink, the RLC processing section 1043 divides the packets, combines the packets, applies RLC layer retransmission control, and so on.

The measurement section 1044 measures the channel state (for example, the SINR, the SNR, the RSRP, etc.) based on a measurement reference signal (for example, the SRS). The measurement section 1044 estimates channel state information (CSI) based on the channel state measurement result. The CSI may include a channel quality indicator (CQI), a rank indicator (RI) and a precoding matrix indicator (PMI: Precoding Matrix Indicator).

The decision section 1045 decides whether or not to non-orthogonal-multiplex uplink signals of a plurality of user terminals 20. To be more specific, the decision section 1045 decides whether or not to non-orthogonal-multiplex uplink signals of a plurality of user terminals 20 based on channel state measurement results in the measurement section 1044. When non-orthogonal multiplexing will be executed, the decision section 1045 may determine the combination of a plurality of user terminals 20 to be non-orthogonal-multiplexed (user set, UE set, etc.), and outputs this to the generation section 1046.

The generation section 1046 generates transmission power control information for controlling the transmission power of uplink signals based on the decision in the decision section 1045. The transmission power control information may include one or both of switching information and transmission power determining information (the first example and variations 1 and 2), or include transmission power allocation information (the second example).

To be more specific, in accordance with the first example, the generation section 1046 may generate switching information and transmission power determining information based on the decision in the decision section 1045. As described earlier, the switching information commands a switch to (commands applying) either the NOMA power control method (the first transmission power control method), which is used when uplink signals are non-orthogonal-multiplexed, or the OMA power control method (the second transmission power control method), which is used when uplink signals are not non-orthogonal-multiplexed.

Also, the transmission power determining information is used to determine the transmission power of uplink signals in the user terminals 20. When the switching information commands a switch to the NOMA power control method, the transmission power determining information may be a predetermined threshold for the channel states between the user terminals 20 and the radio base station 10. Also, when the switching information commands a switch to the OMA power control method, the transmission power determining information may be a TPC command.

Also, the generation section 1046 outputs the generated switching information and transmission power determining information to the layer 1 processing section 1041. Note that the switching information may be mapped to the downlink control channel (PDCCH, EPDCCH, etc.) in the layer 1 processing section 1041, or may be mapped to the downlink shared channel (PDSCH) as higher layer control information for RRC signaling and so on. Also, the transmission power determining information is mapped to the downlink control channel (PDCCH, EPDCCH, etc.) in the layer 1 processing section 1041.

Also, the generation section 1046 may generate transmission power control rules (the above-described switching rules, decision rules, etc.) and transmission power control parameters (the maximum transmission power $P_{CMAX}$, the target received power $P_{O\_PUSCH}$ and the weighting coefficient α in above equation 1, the transmission powers P1 and P2 which the user terminals 20 select based on the comparison results of the channel states and the predetermined threshold, etc.). The transmission power control rules and transmission power control parameters may be mapped to the downlink shared channel (PDSCH) as higher layer control information for RRC signaling and so on, in the layer 1 processing section 1041.

Also, in the second example, the generation section 1046 determines (allocates) the transmission power of uplink signals based on the decision in the decision section 1045, and generates transmission power allocation information representing the determined (allocated) transmission power. When uplink signals from a plurality of user terminals 20 are not non-orthogonal-multiplexed, the generation section 1046 may determine the transmission power of the uplink signals based on the channel states between the radio base station 10 and the user terminals 20. On the other hand, when uplink signals of a plurality of user terminals 20 are non-orthogonal-multiplexed, the generation section 1046 may determine the combination of the plurality of user terminals 20 (user set, UE set, etc.), and determine the transmission power of the uplink signal so that the plurality of user terminals 20 achieves gain from the non-orthogonal multiplexing.

The generation section 1046 outputs the generated transmission power allocation information to the layer 1 processing section 1041. The transmission power allocation information is mapped to the downlink control channel (PDCCH, EPDCCH, etc.) in the layer 1 processing section 1041.

The structure of the user terminals according to the present embodiment will be described with reference to FIGS. 11 and 12.

Figure 11:
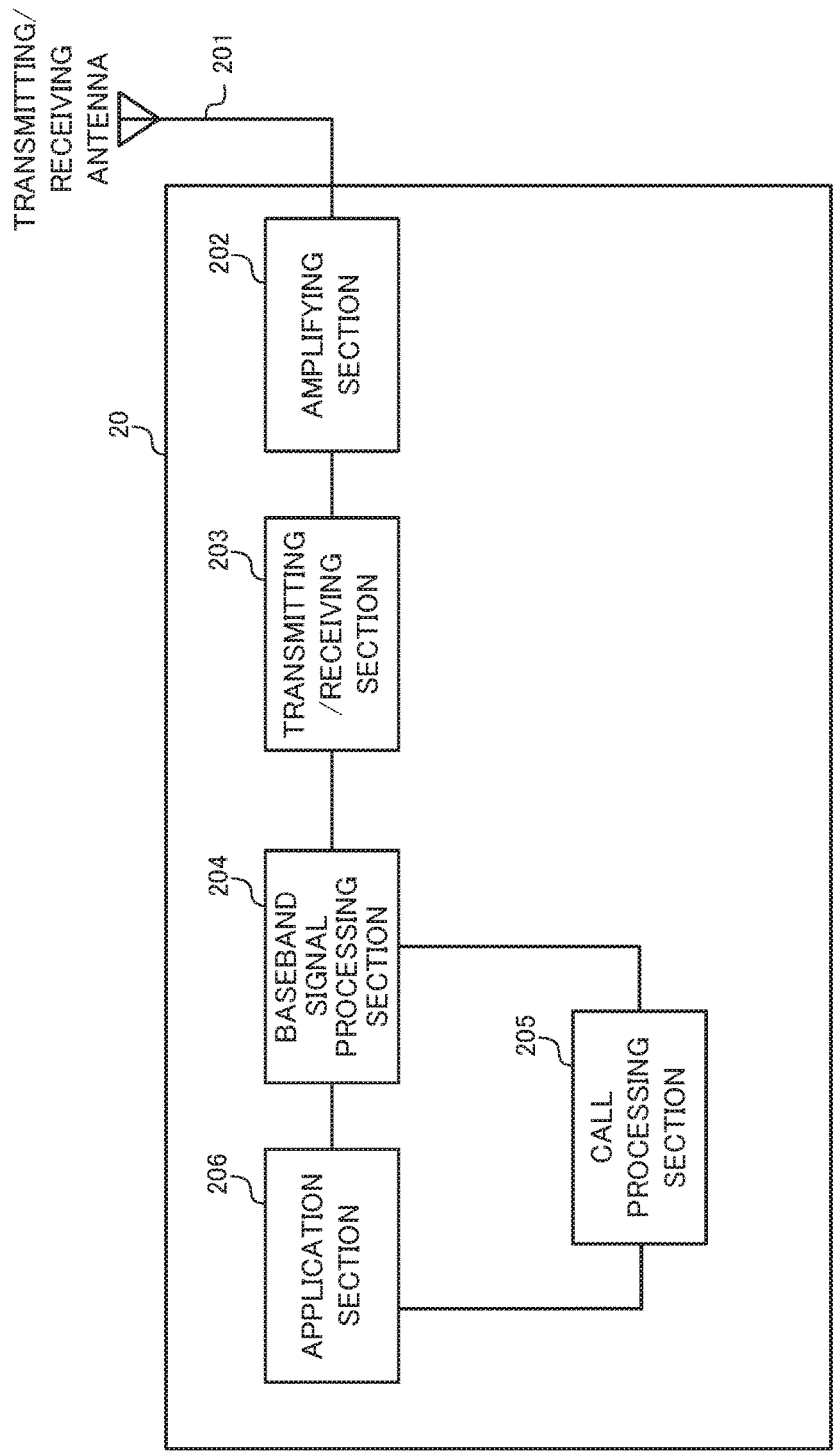
FIG. 11 is a diagram to show an overall structure of a user terminal according to the present embodiment.
Figure 12:
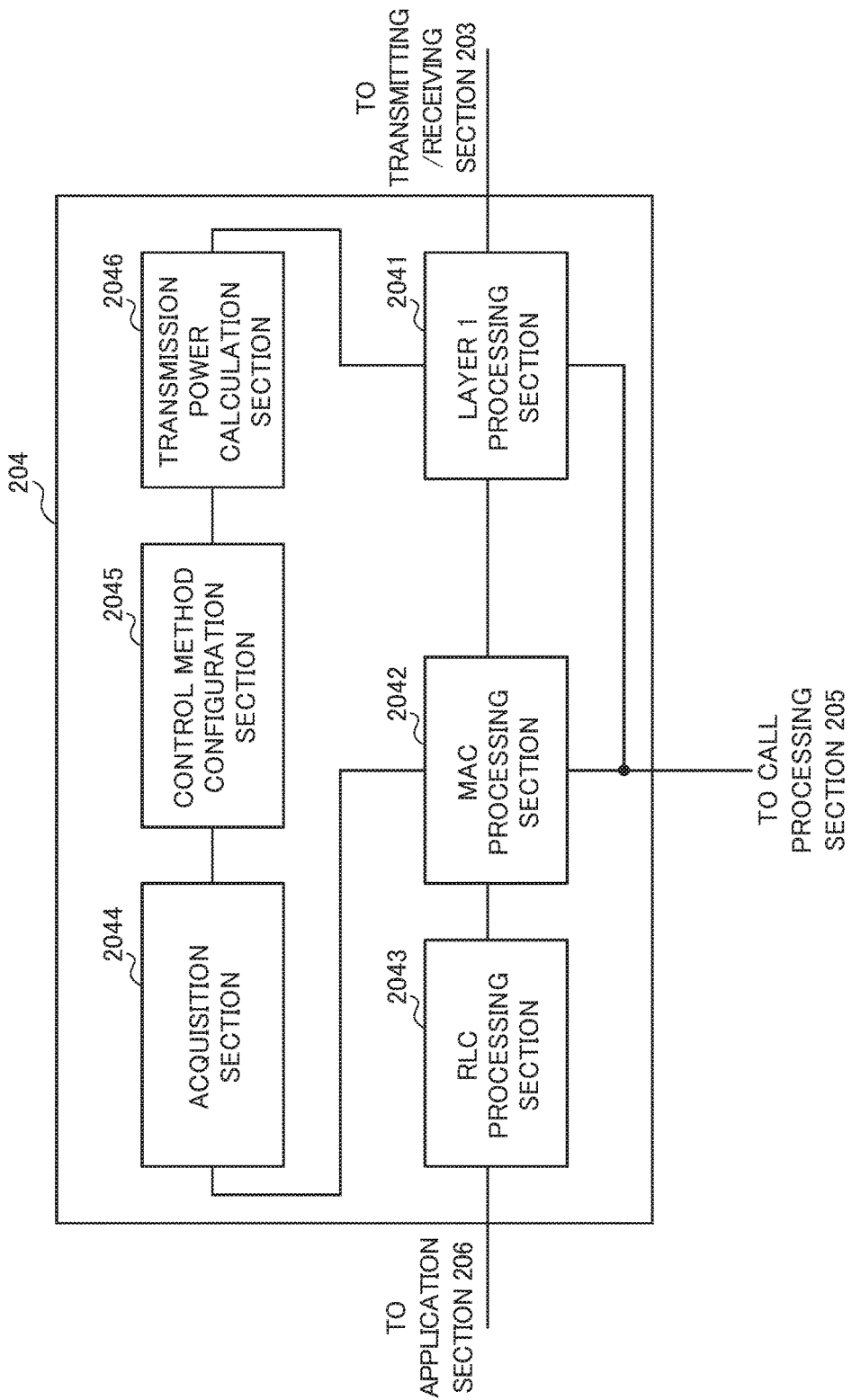
FIG. 12 is a diagram to show a functional structure of a user terminal according to the present embodiment.

FIG. 11 is a diagram to show an overall structure of a user terminal 20 according to the present embodiment. As shown in FIG. 11, the user terminal 20 has a transmitting/receiving antenna (antenna port) 201, an amplifying section 202, a transmitting/receiving section 203 (transmission section and/or receiving section), a baseband signal processing section 204, a call processing section 205 and an application section 206. A plurality of transmitting/receiving antenna 201 may be provided.

Uplink user data is input from the application section 205 to the baseband signal processing section 204. In the baseband signal processing section 204, a retransmission control (HARQ) process, scheduling, transport format selection, channel coding, transmission power configuration and so on take place, and the result is transferred to the transmitting/receiving section 203. The baseband signal that is output from the baseband signal processing section 204 is subjected to frequency conversion in the transmitting/receiving section 203, and converted into a radio frequency signal. The frequency-converted signal is then amplified in the amplifying section 202 and transmitted from the transmitting/receiving antenna 201.

As for downlink data, a radio frequency signal that is received in the transmitting/receiving antenna 201 is amplified in the amplifying section 202. The amplified radio frequency signal is subjected to frequency conversion in the transmitting/receiving section 203 and converted into a baseband signal. This baseband signal is subjected to predetermined processes (error correction, decoding, etc.) in the baseband signal processing section 204, and then transferred to the call processing section 205 and the application section 206. The call processing section 205 manages communication with the radio base station 10 and so on, and the application section 206 performs processes related to higher layers than the physical layer and the MAC layer.

The functional structure of the baseband processing section of the user terminal according to the present embodiment will be described with reference to FIG. 12. FIG. 12 is a functional block diagram of the baseband signal processing section 204 of the user terminal 20. The baseband signal processing section 204 has a layer 1 processing section 2041, a MAC processing section 2042, an RLC processing section 2043, an acquisition section 2044, a control method configuration section 2045 and a transmission power determining section 2046.

The layer 1 processing section 2041 mainly performs processes related to the physical layer. In the layer 1 processing section 2041, a downlink signal is subjected to processes including, for example, channel decoding, a discrete Fourier transform (DFT), demapping, a fast Fourier transform (FFT) and data demodulation. Also, an uplink signal is subjected to processes such as channel coding, data modulation, mapping, an inverse Fourier transform (IFFT) and so on.

The MAC processing section 2042 applies MAC layer retransmission control (hybrid ARQ) to the downlink signal, analyzes the scheduling information for the downlink (including specifying the PDSCH transport format and specifying the PDSCH resource blocks), and so on. Also, the MAC processing section 1082 applies MAC retransmission control to the uplink signal, analyzes the uplink scheduling information (processes including specifying the PUSCH transport format, specifying the PDSCH resource blocks, etc.), and so on.

For packets received on the uplink and packets received from the application section 206 to transmit on the downlink, the RLC processing section 2043 divides the packets, combines the packets, applies RLC layer retransmission control, and so on.

The acquisition section 2044 acquires the transmission power control information received from the radio base station 10. As described above, the transmission power control information may include one or both of switching information and transmission power determining information (the first example and variations 1 and 2), or include transmission power allocation information (the second example). Also, the acquisition section 2044 may acquire the above-described transmission power control rules and transmission power control parameters.

The control method configuration section 2045 configures (switches between) the NOMA power control method or the OMA power control method based on switching information input from the acquisition section 2044. For example, the control method configuration section 2045 may configure the OMA power control method when the switching information is "0," and configure the NOMA power control method when the switching information is "1." Note that which of "0" and "1" represents the OMA power control method or the NOMA power control method may be provided for in the switching rules reported from the radio base station 10.

The transmission power determining section 2046 determines the transmission power of uplink signals, and commands the layer 1 processing section 2041 to transmit uplink signals with the determined transmission power.

In accordance with the first example, when a switch is made to the NOMA power control method, the transmission power determining section 2046 may determine the transmission power of uplink signals based on the comparison result of the channel state (for example, the SINR, the SNR, the RSRP) and a predetermined threshold represented by the transmission power determining information. For example, the transmission power determining section 2046 determines using the transmission power P1 when the channel state is better (greater) than a predetermined threshold, and determines using the transmission power P2, which is greater than the transmission power P1, when the channel state is poorer (lower) than the predetermined threshold. As described earlier, the transmission powers P1 and P2 may be reported in advance as transmission power control parameters.

Also, when, in accordance with the first example, a switch is made to the OMA power control method (when the OMA power control method is applied), the transmission power determining section 2046 may determine the transmission power of uplink signals based on a TPC command reported as transmission power determining information.

Note that, according to variation 1, the transmission power determining section 2046 determines the transmission power of uplink signals based on transmission power correction information (for example, the correction value f(i) in the above equation 1) that varies depending on whether or not the uplink signals are non-orthogonal-multiplexed. In this case, the acquisition section 2044 may receive an enhanced TPC command from the radio base station as transmission power control information. Also, according to variation 2, too, the transmission power determining section 2046 determines the transmission power of uplink signals based on the comparison result of the channel state and a predetermined threshold represented by the transmission power determining information. Note that the control method configuration section 2045 may be skipped in variations 1 and 2, and the above-noted switching information needs not be reported to the user terminal 20 either. However, the radio base station 10 sends a report as to whether or not to non-orthogonal-multiplex uplink signals of a plurality of user terminals 20.

Also, in accordance with the second example, the transmission power determining section 2046 determines on the transmission power that is represented by the transmission power allocation information reported from the radio base station 10. Note that, in the second example, the above-described control method configuration section 2045 may be omitted.

As described above, the radio communication system 1 according to the present embodiment makes it possible to execute uplink signal transmission power control that is suitable when non-orthogonal multiple access (NOMA) is used on the uplink.

To be more specific, with the radio communication system 1, user terminals 20 switch between the NOMA power control method and the OMA power control method for application based on switching information from the radio base station 10, so that it is possible to prevent the situation where the improvement of system performance by non-orthogonal multiplexing cannot be optimized when uplink signals of a plurality of user terminals 20 are non-orthogonal-multiplexed (the first example).

Also, in the radio communication system 1, when uplink signals from user terminals 20 are non-orthogonal-multiplexed, the radio base station 10 determines and reports the transmission power of the uplink signals to the user terminals 20 so that the improvement of system performance by non-orthogonal multiplexing can be optimized, and therefore it is possible to prevent the situation where the gain of non-orthogonal multiplexing cannot be optimized (the second example).

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention. That is to say, the descriptions herein are provided only for the purpose of explaining examples, and should by no means be construed to limit the present invention in any way.

The invention claimed is:

1. A user terminal comprising:
a receiver that receives, from a radio base station:
  indication information to indicate whether or not uplink signals of a plurality of user terminals are non-orthogonal-multiplexed; and
  transmission power determining information that is used to determine transmission power of the uplink signal;
a processor that:
  switches between transmission power control methods based on the indication information; and
  determines transmission power of the uplink signal based on the indication information and the transmission power determining information,
    wherein, when the indication information indicates that the uplink signals of the plurality of user terminals are non-orthogonal-multiplexed, the transmission power determining information is a given threshold for a channel state between the user terminal and the radio base station, and
  determines the transmission power based on a comparison result of the channel state and the given threshold; and
a transmitter that transmits to the base station an uplink signal with the transmission power determined by using a switched transmission power control method.

2. The user terminal according to claim 1, wherein when the indication information indicates that uplink signals of the plurality of user terminals are not non-orthogonal-multiplexed, the transmission power determining information is a Transmission Power Control (TPC) command, and
the processor determines the transmission power based on the TPC command.

3. The user terminal according to claim 1, wherein the receiver receives the indication information using higher layer signaling or a downlink control channel, and receives the transmission power determining information using the downlink control channel.

4. A radio communication method for a user terminal, comprising:
receiving, from a radio base station:
indication information to indicate whether or not uplink signals of a plurality of user terminals are non-orthogonal-multiplexed; and
transmission power determining information that is used to determine transmission power of the uplink signal;
switching between transmission power control methods based on the indication information;
determining transmission power of the uplink signal based on the indication information and the transmission power determining information,
wherein, when the indication information indicates that the uplink signals of the plurality of user terminals are non-orthogonal-multiplexed, the transmission power determining information is a given threshold for a channel state between the user terminal and the radio base station, and
determining the transmission power based on a comparison result of the channel state and the given threshold; and
transmitting to the base station an uplink signal with the transmission power determined by using a switched transmission power control method.

* * * * *